(12) United States Patent
Fujita

(10) Patent No.: US 10,348,989 B2
(45) Date of Patent: Jul. 9, 2019

(54) IMAGE PROCESSING DEVICE, IMAGE PROCESSING METHOD, AND IMAGE PROCESSING SYSTEM

(71) Applicant: SONY SEMICONDUCTOR SOLUTIONS CORPORATION, Kanagawa (JP)

(72) Inventor: Kazuhide Fujita, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 90 days.

(21) Appl. No.: 15/505,063

(22) PCT Filed: Aug. 14, 2015

(86) PCT No.: PCT/JP2015/072952
§ 371 (c)(1),
(2) Date: Feb. 17, 2017

(87) PCT Pub. No.: WO2016/031597
PCT Pub. Date: Mar. 3, 2016

(65) Prior Publication Data
US 2017/0257584 A1   Sep. 7, 2017

(30) Foreign Application Priority Data
Aug. 27, 2014  (JP) ................. 2014-172360

(51) Int. Cl.
*H04N 5/367* (2011.01)
*H04N 5/217* (2011.01)
(Continued)

(52) U.S. Cl.
CPC ......... *H04N 5/3675* (2013.01); *G06T 3/4038* (2013.01); *H04N 5/2176* (2013.01);
(Continued)

(58) Field of Classification Search
CPC .... H04N 5/3675; H04N 5/2176; H04N 9/646; G06T 3/4038
See application file for complete search history.

(56) References Cited

U.S. PATENT DOCUMENTS

| 2010/0104209 | A1* | 4/2010 | Deever | H04N 5/3675 |
| | | | | 382/260 |
| 2012/0250994 | A1* | 10/2012 | Shinozaki | H04N 1/401 |
| | | | | 382/167 |
| 2014/0063297 | A1* | 3/2014 | Yamura | H04N 5/367 |
| | | | | 348/242 |

FOREIGN PATENT DOCUMENTS

| JP | 2003-116060 A | 4/2003 |
| JP | 2009-290653 A | 12/2009 |

(Continued)

*Primary Examiner* — Ahmed A Berhan
(74) *Attorney, Agent, or Firm* — Chip Law Group

(57) ABSTRACT

The present technology relates to an image processing device, an image processing method, and an image processing system capable of improving detection accuracy of a defective pixel. Provided is an image processing device including a defective pixel estimation unit that estimates a defect of a pixel of interest in an image captured by a solid-state imaging device that contains a two-dimensional array of color pixels, and high-sensitivity pixels having higher sensitivity than sensitivities of the color pixels. The defect of the pixel of interest is estimated on the basis of a correlation between pixel values of the high-sensitivity pixels, and pixel values of the color pixels. The image processing device further includes a defective pixel correction unit that corrects the pixel of interest when it is estimated that the pixel of interest is a defective pixel. The present technology is applicable to an image processing device which corrects a defective pixel by signal processing, for example.

7 Claims, 12 Drawing Sheets

(51) Int. Cl.
*G06T 3/40* (2006.01)
*H04N 9/04* (2006.01)
*H04N 9/64* (2006.01)
*H04N 9/07* (2006.01)

(52) U.S. Cl.
CPC ............. *H04N 5/367* (2013.01); *H04N 9/045* (2013.01); *H04N 9/07* (2013.01); *H04N 9/646* (2013.01)

(56) References Cited

FOREIGN PATENT DOCUMENTS

| | | |
|---|---|---|
| JP | 2010-130238 A | 6/2010 |
| JP | 2012-151528 A | 8/2012 |
| JP | 2013-115675 A | 6/2013 |
| WO | 2013111449 A1 | 8/2013 |

* cited by examiner

FIG. 2

| B | W | R | W | B | W | R | W | B |
|---|---|---|---|---|---|---|---|---|
| W | G | W | G | W | G | W | G | W |
| R | W | B | W | R | W | B | W | R |
| W | G | W | G | W | G | W | G | W |
| B | W | R | W | B | W | R | W | B |
| W | G | W | G | W | G | W | G | W |
| R | W | B | W | R | W | B | W | R |
| W | G | W | G | W | G | W | G | W |
| B | W | R | W | B | W | R | W | B |

31

IMAGE PROCESSING DEVICE, IMAGE PROCESSING METHOD, AND IMAGE PROCESSING SYSTEM

CROSS REFERENCE TO RELATED APPLICATIONS

This application is a U.S. National Phase of International Patent Application No. PCT/JP2015/072952 filed on Aug. 14, 2015, which claims priority benefit of Japanese Patent Application No. JP 2014-172360 filed in the Japan Patent Office on Aug. 27, 2014. Each of the above-referenced applications is hereby incorporated herein by reference in its entirety.

TECHNICAL FIELD

The present technology relates to an image processing device, an image processing method, and an image processing system, and more particularly to an image processing device, an image processing method, and an image processing system capable of increasing detection accuracy of a defective pixel.

BACKGROUND ART

It is generally known that a defective pixel may be produced in a solid-state imaging device such as a complementary metal oxide semiconductor (CMOS) image sensor and a charge coupled device (CCD) image sensor.

In the solid-state imaging device, when a defective pixel is produced by a local defective crystal of a semiconductor and outputs an abnormal imaging signal, for example, image quality deteriorates as a result of this abnormal imaging signal. Examples of this type of defective pixel include a so-called defective white point which has a larger pixel value than pixel values of peripheral pixels, and a so-called defective black point which has a smaller pixel value than pixel values of peripheral pixels.

There have been proposed various systems and circuit configurations which correct these defective pixels by signal processing (for example, see Patent Documents 1 and 2).

CITATION LIST

Patent Document

Patent Document 1: Japanese Patent Application Laid-Open No. 2009-290653
Patent Document 2: Japanese Patent Application Laid-Open No. 2013-115675

SUMMARY OF THE INVENTION

Problems to be Solved by the Invention

However, conventional technologies are difficult to accurately determine whether a pixel of interest in a captured image is a defective pixel (defective point), or a pattern having an extremely high spatial frequency (such as a micro point). Accordingly, there has been a demand for accurate determination of whether a pixel is a defective pixel, and improvement of detection accuracy of a defective pixel.

The present technology developed in consideration of the aforementioned circumstances improves detection accuracy of a defective pixel.

Solutions to Problems

An image processing device according to one aspect of the present technology includes: a defective pixel estimation unit that estimates a defect of a pixel of interest in an image captured by a solid-state imaging device that contains a two-dimensional array of color pixels, and high-sensitivity pixels having higher sensitivity than sensitivities of the color pixels, the defect of the pixel of interest being estimated on the basis of a correlation between pixel values of the high-sensitivity pixels, and pixel values of the color pixels; and a defective pixel correction unit that corrects the pixel of interest when it is estimated that the pixel of interest is a defective pixel.

The defective pixel estimation unit may obtain the correlation between the pixel values of the high-sensitivity pixels and the pixel values of the color pixels on the basis of distribution information on pixel values of the peripheral high-sensitivity pixels and the peripheral color pixels surrounding the pixel of interest.

When the pixel of interest is one of the color pixels, the defective pixel estimation unit may compare a gradient of the pixel values of the peripheral high-sensitivity pixels surrounding the pixel of interest with a gradient of the pixel values of the peripheral color pixels surrounding the pixel of interest and having the same color as the color of the pixel of interest. When the pixel of interest is one of the high-sensitivity pixels, the defective pixel estimation unit may compare a gradient of the pixel values of the peripheral color pixels surrounding the pixel of interest with a gradient of the pixel values of the peripheral high-sensitivity pixels surrounding the pixel of interest. The defective pixel estimation unit may obtain the correlation between the pixel values of the high-sensitivity pixels and the pixel values of the color pixels on the basis of the comparison.

The defective pixel estimation unit may obtain the gradient of the pixel values of the high-sensitivity pixels, and the gradient of the pixel values of the color pixels in a horizontal direction or a vertical direction with respect to the pixel of interest.

The defective pixel estimation unit may estimate a possibility of a defect of the pixel of interest by comparing a predetermined threshold with a difference between a pixel value of the pixel of interest and an average of the pixel values of the peripheral color pixels surrounding the pixel of interest and having the same color as the color of the pixel value. The defective pixel estimation unit may estimate the defect of the pixel of interest on the basis of the correlation between the pixel values of the high-sensitivity pixels and the pixel values of the color pixels when it is estimated that the pixel of interest may be a defective pixel.

The high-sensitivity pixels may be white (W) pixels, while the color pixels may be red (R) pixels, green (G) pixels, or blue (B) pixels.

The image processing device according to the one aspect of the present technology may be an individual device, or an internal block constituting one device.

An image processing method and an image processing system according to one aspect of the present technology is an image processing method and an image processing system corresponding to the image processing device of the one aspect of the present technology described above.

The image processing device, the image processing method, and the image processing system of the one aspect of the present technology estimate a defect of a pixel of interest in an image captured by a solid-state imaging device that contains a two-dimensional array of color pixels, and high-sensitivity pixels having higher sensitivity than sensitivities of the color pixels. The defect of the pixel of interest is estimated on the basis of a correlation between pixel values of the high-sensitivity pixels, and pixel values of the color pixels. The pixel of interest is corrected when it is estimated that the pixel of interest is a defective pixel.

Effects of the Invention

According to an aspect of the present technology, detection accuracy of a defective pixel improves.

Note that advantages to be offered are not limited to these advantages, but may be any of advantages described in the present disclosure.

BRIEF DESCRIPTION OF DRAWINGS

FIG. 2 is a view illustrating an array of a color filter included in a solid-state imaging device.

MODES FOR CARRYING OUT THE INVENTION

An embodiment according to the present technology is hereinafter described with reference to the drawings. Note that the description is presented in the following order.
1. Configuration of Image Processing System
2. Configuration of Image Processing Device
3. Flow of Image Processing
4. Modified Example 1. Configuration of Image Processing System FIG. 1 is a view illustrating a configuration of an image processing system according to an embodiment to which the present technology has been applied.

Figure 1:
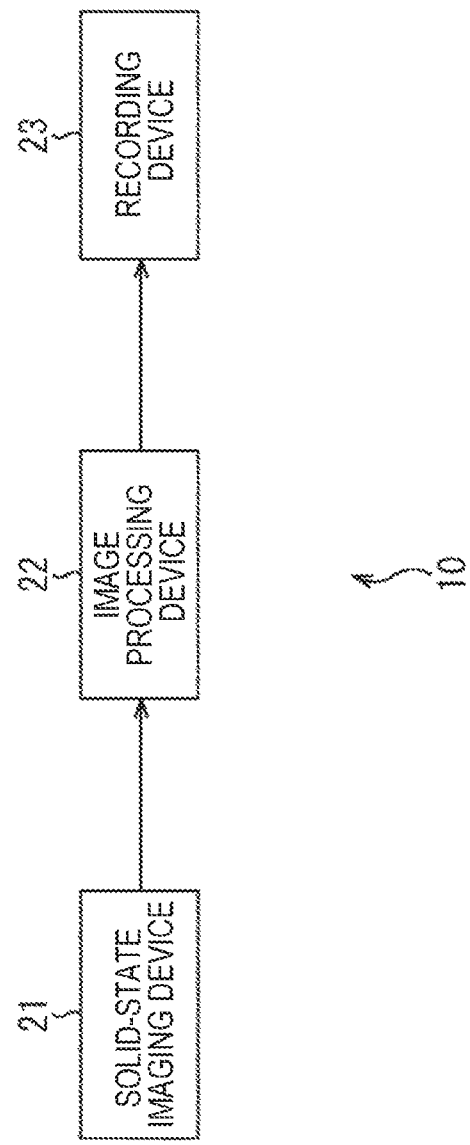
FIG. 1 is a view illustrating a configuration of an image processing system according to an embodiment to which the present technology has been applied.

An image processing system 10 illustrated in FIG. 1 is an imaging device such as a digital still camera and a video camera, a cellular phone, a smartphone, a tablet-type device, a personal computer, or other devices having a function of performing predetermined image processing for an image captured by imaging a subject. The image processing system 10 illustrated in FIG. 1 is constituted by a solid-state imaging device 21, an image processing device 22, and a recording device 23.

The solid-state imaging device 21 is an image sensor such as a CMOS image sensor and a CCD image sensor, for example. The solid-state imaging device 21 is constituted by a pixel array unit and a peripheral circuit unit. The pixel array unit includes a two-dimensional array of a plurality of pixels disposed in matrix. Each of the pixels contains a photoelectric conversion element (photodiode). The peripheral circuit unit performs processes such as driving the pixels, and analog-to-digital conversion (A/D) for the pixels.

The solid-state imaging device 21 obtains a captured image by photoelectric conversion of light condensed by a lens unit, and supplies the captured image to the image processing device 22. The solid-state imaging device 21 further includes a color filter disposed in front of the pixel array unit. Here, FIG. 2 illustrates a filter array of a color filter 31 disposed in front of the pixel array unit as described above. The color filter 31 includes an array of red (R), green (G), blue (B), and white (W).

More specifically, the pixel array unit of the solid-state imaging device 21 includes rows in which white (W) pixels corresponding to high-sensitivity pixels, and red (R) pixels or blue (B) pixels corresponding to color pixels are alternately disposed, and rows in which white (W) pixels corresponding to high-sensitivity pixels, and green (G) pixels corresponding to color pixels are alternately disposed. The two types of rows are alternately arranged.

On the other hand, the image processing device 22 performs predetermined image processing for the captured image supplied from the solid-state imaging device 21. Examples of the image processing include a defective pixel correction process, a remosaic process, and a camera signal process. Image data indicating the captured image and subjected to the image processing is supplied to the recording device 23.

The recording device 23 is a device on which the image data indicating the captured image and supplied from the image processing device 22 is recorded. According to the configuration illustrated in FIG. 1, the image data indicating the captured image and supplied from the image processing device 22 is recorded on the recording device 23. However, this process is only an example of the process performed for the captured image after the image processing. Such a configuration which displays an image of the subject corresponding to the image data on a display device, or a configuration which transmits the image data to another device via a network by using a communication device may be adopted, instead of the configuration performing the foregoing process.

2. Configuration of Image Processing Device

Figure 3:
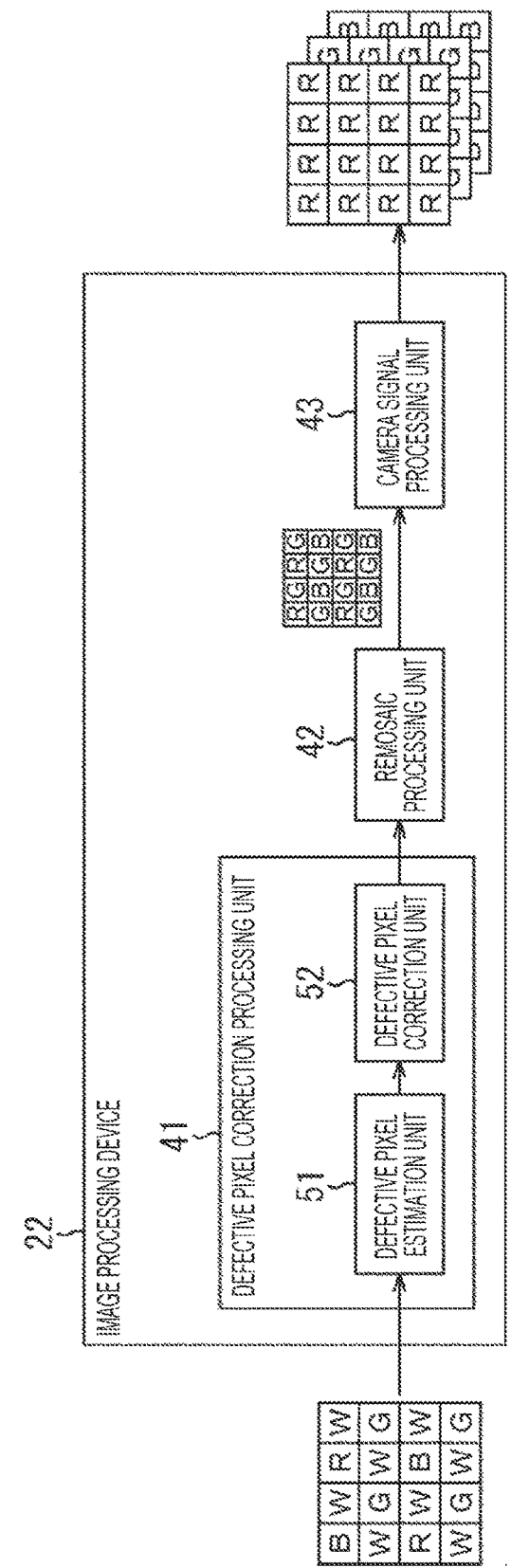
FIG. 3 is a view illustrating a configuration of an image processing device according to the embodiment to which the present technology has been applied.

FIG. 3 is a view illustrating a detailed configuration of the image processing device 22 illustrated in FIG. 1.

The image processing device 22 is constituted by a defective pixel correction processing unit 41, a remosaic processing unit 42, and a camera signal processing unit 43.

The defective pixel correction processing unit 41 detects a defective pixel from an image captured by the solid-state imaging device 21, and performs a process for correcting the detected defective pixel. The defective pixel correction processing unit 41 is constituted by a defective pixel estimation unit 51 and a defective pixel correction unit 52.

The defective pixel estimation unit 51 estimates a defect of a pixel of interest of the captured image in two stages of a primary estimation step and a secondary estimation step, and supplies an estimation result of the defect to the defective pixel correction unit 52.

The defective pixel correction unit 52 corrects the pixel of interest estimated as a defective pixel on the basis of the estimation result of the defect received from the defective pixel estimation unit 51, and supplies the corrected pixel to the remosaic processing unit 42. On the other hand, the defective pixel correction unit 52 supplies the pixel of interest to the remosaic processing unit 42 without change when the pixel of interest is not estimated as a defective pixel on the basis of the estimation result of the defect.

The remosaic processing unit 42 converts a pixel array of the captured image received from the defective pixel correction unit 52 from the array illustrated in FIG. 2 into a Bayer array, and supplies the converted pixel array to the camera signal processing unit 43.

The camera signal processing unit 43 performs predetermined camera signal processing for the captured image received from the remosaic processing unit 42. Examples of this camera signal processing include white balance, demosaic, linear matrix, and gamma correction. An RGB image (or YC image) obtained by the camera signal processing is subjected to image processing necessary for recording on the recording device 23, and then is recorded on the recording device 23.

3. Flow of Image Processing (Flow of Image Processing)
A flow of image processing executed by the image processing device 22 illustrated in FIG. 3 is hereinafter described with reference to a flowchart shown in FIG. 4.

In step S11, the defective pixel correction processing unit 41 performs a defective pixel correction process. The defective pixel correction process estimates a pixel of interest of a captured image in two stages of the primary estimation step and the secondary estimation step, and corrects the pixel of interest when it is estimated that the pixel of interest may be a defective pixel on the basis of estimation results of both the steps.

More specifically, the primary estimation step estimates whether or not a pixel value of the pixel of interest, and an average of pixel values of two peripheral pixels surrounding the pixel of interest and having the same color as the color of the pixel of interest exceed a predetermined threshold. In addition, the secondary estimation step estimates a defect of the pixel of interest on the basis of a correlation between pixel values of high-sensitivity pixels, i.e., white (W) pixels, and pixel values of color pixels, i.e., red (R) pixels, green (G) pixels, or blue (B) pixels when it is estimated that the pixel of interest may be a defective pixel on the basis of the estimation result of the primary estimation step.

Thereafter, the defective pixel correction processing unit 41 performs a correction process for the pixel of interest estimated as a defective pixel on the basis of the two-stage estimation results of the primary estimation step and the secondary estimation step. Note that details of the defective pixel correction process will be described with reference to a flowchart shown in FIG. 5.

In step S12, the remosaic processing unit 42 performs a remosaic process. In the remosaic process, a pixel array of a captured image after correction of a defective pixel by the process in step S11 is converted from the pixel array illustrated in FIG. 2 into a Bayer array.

In step S13, the camera signal processing unit 43 performs a camera signal process. In the camera signal process, processing such as white balance, demosaic, linear matrix, and gamma correction is executed. After completion of the process in step S13, the image processing shown in FIG. 4 ends.

Description of the image processing is now completed. In this image processing, a defect of a pixel of interest in a captured image is estimated in two states of the primary estimation step and the secondary estimation step. In the second estimation step, the defect of the pixel of interest is estimated on the basis of a correlation between pixel values of high-sensitivity pixels (white (W) pixels) and pixel values of color pixels (red (R) pixels, green (G) pixels, or blue (B) pixels) when it is estimated that the pixel of interest may be a defective pixel in the primary estimation step. This estimation accurately determines whether the pixel of interest is a defective pixel, or a pattern having an extremely high spatial frequency (such a as micro point) rather than a defective pixel, thereby improving detection accuracy of a defective pixel.

In addition, when the remosaic processing unit 42 receives and processes a defective pixel, the defect of the pixel increases by filtering calculation of the remosaic processing unit 42. In this case, the defective pixel is difficult to correct by a defective pixel correction process performed on the downstream side. However, according to the image processing shown in FIG. 4, the defective pixel correction process (process in step S11) is performed prior to the remosaic process (process in step S12) and other processes. Accordingly, the foregoing situation is avoidable beforehand.

Figure 4:
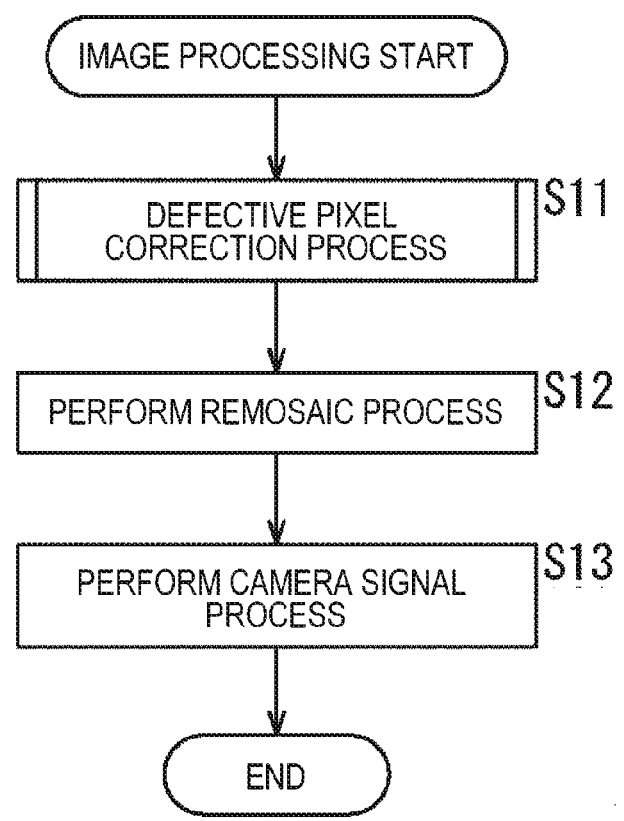
FIG. 4 is a flowchart showing a flow of image processing.

(Flow of Defective Pixel Correction Process)
A flow of the defective pixel correction process corresponding to the process in step S11 in FIG. 4 is now described with reference to a flowchart shown in FIG. 5. Note that examples of a defective pixel include a white point defective pixel which has a larger pixel value than pixel values of peripheral pixels, and a black point defective pixel which has a smaller pixel value than pixel values of peripheral pixels. Discussed herein is a process for detecting a white point defect as a defective pixel, and corrects the detected defective pixel.

In step S31, the defective pixel estimation unit 51 estimates whether or not a difference between a pixel value of a pixel of interest and an average of pixel values of peripheral pixels surrounding the pixel of interest and having the same color as the color of the pixel of interest exceeds a predetermined threshold (primary estimation step). In the primary estimation step, the estimation method to be used differs for each color of the pixel of interest.

Figure 6:
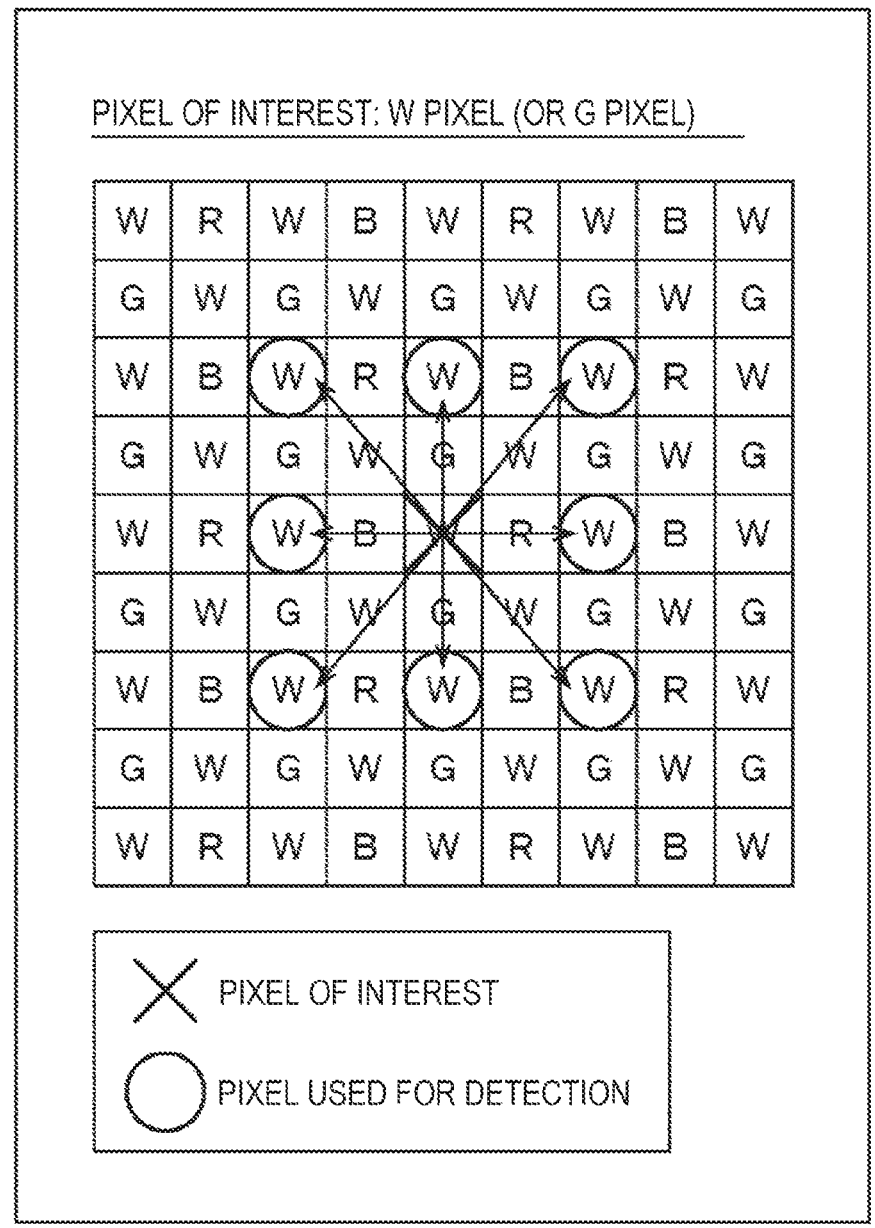
FIG. 6 is a view illustrating a primary estimation step performed when a pixel of interest is a W pixel or a G pixel.

More specifically, when the pixel of interest is a W pixel as illustrated in FIG. 6 (W pixel at the center of FIG. 6), peripheral W pixels surrounding this pixel of interest (W pixel) are disposed in a square shape. An average of pixel values of each pair of the W pixels in the vertical direction, in the horizontal direction, and in the oblique directions (two directions of +45 degrees and −45 degrees), each pair connected by an arrow in the figure, is calculated for the peripheral eight pixels (W pixels) disposed in the foregoing shape and having the same color as the color of the pixel of interest (W pixel).

Thereafter, a difference is calculated between the pixel value of the pixel of interest (W pixel) and each of the four averages thus obtained for the four pairs of W pixels. The smallest difference of the respective calculated differences is compared with the predetermined threshold. In addition, when the difference exceeds the threshold as a result of this comparison, it is estimated that the pixel of interest (W pixel) may be a defective pixel (i.e., there is a possibility that the pixel of interest is a defective pixel). On the other hand, when the difference does not exceed the threshold, it is estimated that the pixel of interest (W pixel) is not a defective pixel.

Note that the pixel of interest discussed above with reference to FIG. 6 is a W pixel. When the pixel of interest is a G pixel, peripheral G pixels are disposed in a square shape similarly to the peripheral pixels of the W pixel of interest. Accordingly, the primary estimation step is performed for the G pixel of interest in a manner similar to the primary estimation step for the W pixel of interest described above (FIG. 6).

Figure 7:
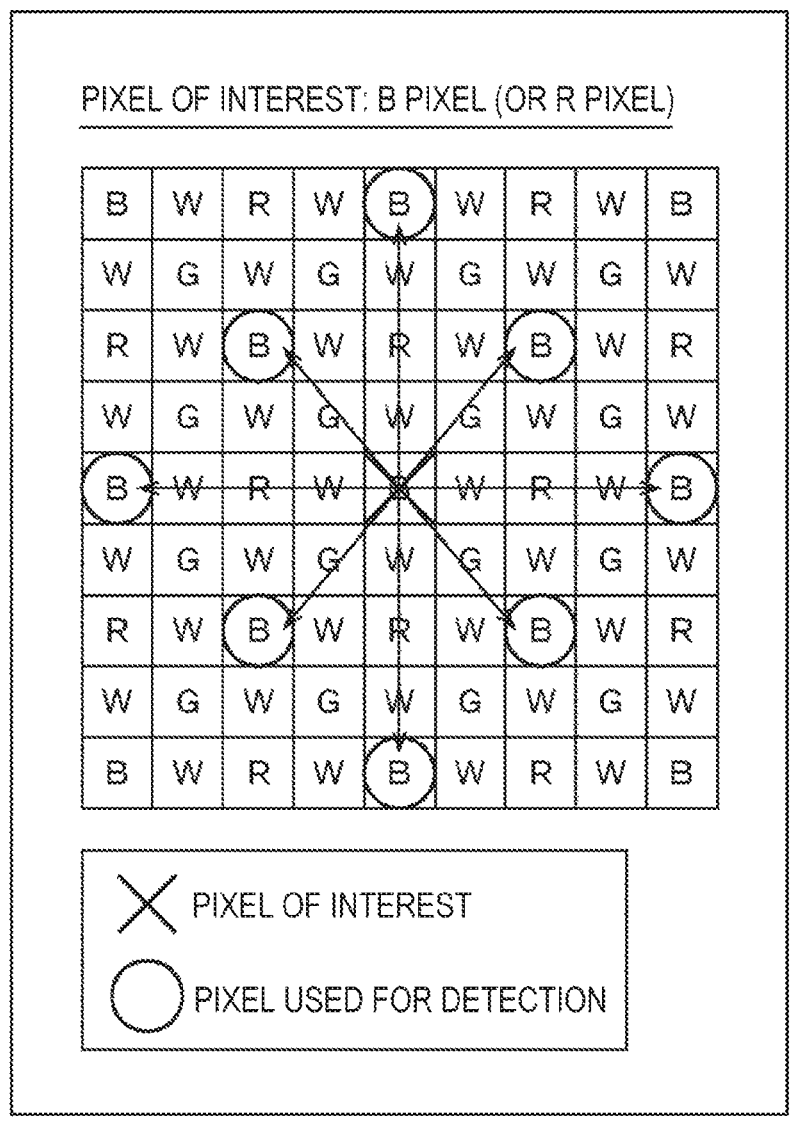
FIG. 7 is a view illustrating the primary estimation step performed when a pixel of interest is a B pixel or an R pixel.

On the other hand, when the pixel of interest is a B pixel as illustrated in FIG. 7 (B pixel at the center of FIG. 7), peripheral B pixels of the pixel of interest (B pixel) are disposed in a diamond shape. An average of pixel values of each pair of the B pixels in the vertical direction, in the horizontal direction, and in the oblique directions (two directions of +45 degrees and −45 degrees), each pair connected by an arrow in the figure, is calculated for the peripheral eight pixels (B pixels) disposed in the foregoing shape and having the same color as the color of the pixel of interest (B pixel).

Thereafter, a difference is calculated between the pixel value of the pixel of interest (B pixel) and each of the four averages thus obtained for the four pairs of B pixels. The smallest difference of the respective calculated differences is compared with the predetermined threshold. When the difference exceeds the threshold as a result of this comparison, it is estimated that the pixel of interest (B pixel) may be a defective pixel (i.e., there is a possibility that the pixel of interest is a defective pixel). On the other hand, when the difference does not exceed the threshold, it is estimated that the pixel of interest (B pixel) is not a defective pixel.

The pixel of interest discussed with reference to FIG. 7 is a B pixel. When the pixel of interest is an R pixel of interest, peripheral R pixels are disposed in a diamond shape similarly to the peripheral pixels of the B pixel of interest. Accordingly, the primary estimation step is performed for the R pixel of interest in a manner similar to the primary estimation step for the B pixel of interest described above (FIG. 7).

In addition, the predetermined threshold to be compared with the difference may be either a fixed value determined beforehand, or a variable value set in accordance with shot noise and patterns around pixels in consideration of these factors. In addition, when the primary estimation step is provided by hardware, a buffer constituted by a line memory and a shift register is needed.

Figure 5:
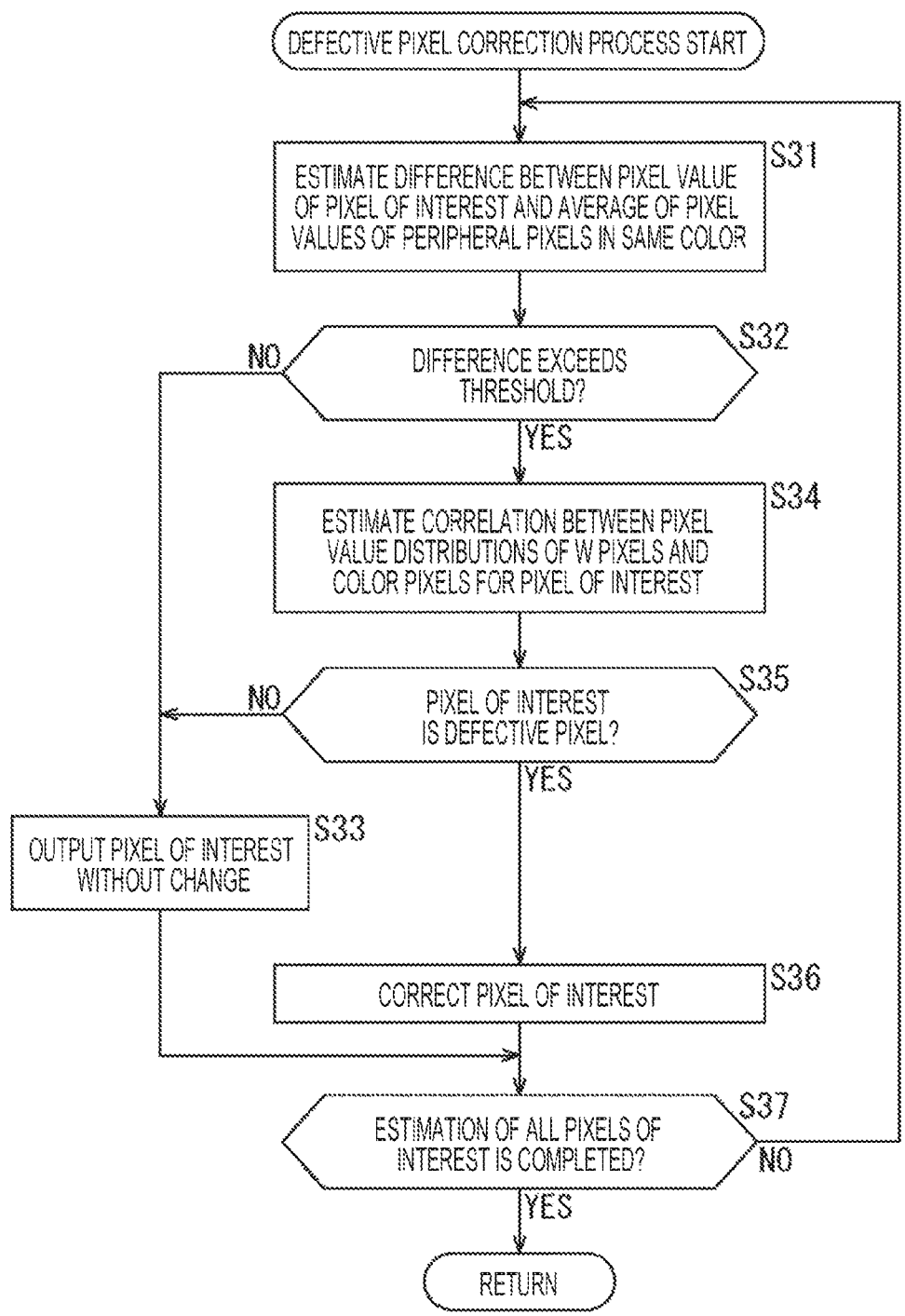
FIG. 5 is a flowchart showing a flow of a defective pixel correction process.

Returning to the flowchart shown in FIG. 5, it is determined in step S32 whether or not the difference calculated for the pixel of interest exceeds a predetermined threshold on the basis of an estimation result of the primary estimation step performed in the process in step S31.

When it is determined in step S32 that the difference does not exceed the threshold, the pixel of interest is not a defective pixel. In this case, the flow proceeds to step S33. In step S33, the defective pixel correction unit 52 outputs the pixel of interest to the remosaic processing unit 42 without change.

On the other hand, when it is determined in step S32 that the difference exceeds the threshold, the pixel of interest may be a defective pixel (i.e., there is a possibility that the pixel of interest is a defective pixel). In this case, the flow proceeds to step S34. In step S34, the defective pixel estimation unit 51 estimates a correlation between pixel value distributions of the W pixels and of the color pixels for the pixel of interest which may be a defective pixel (secondary estimation step).

The secondary estimation step estimates a correlation between pixel value distributions of the W pixels and of the color pixels to determine whether the pixel of interest is a defective pixel (defective point), or a micro point having an extremely high spatial frequency rather than a defective pixel for the pixel of interest estimated as a possible defective pixel in the primary estimation step in the process in step S31.

Figure 8:
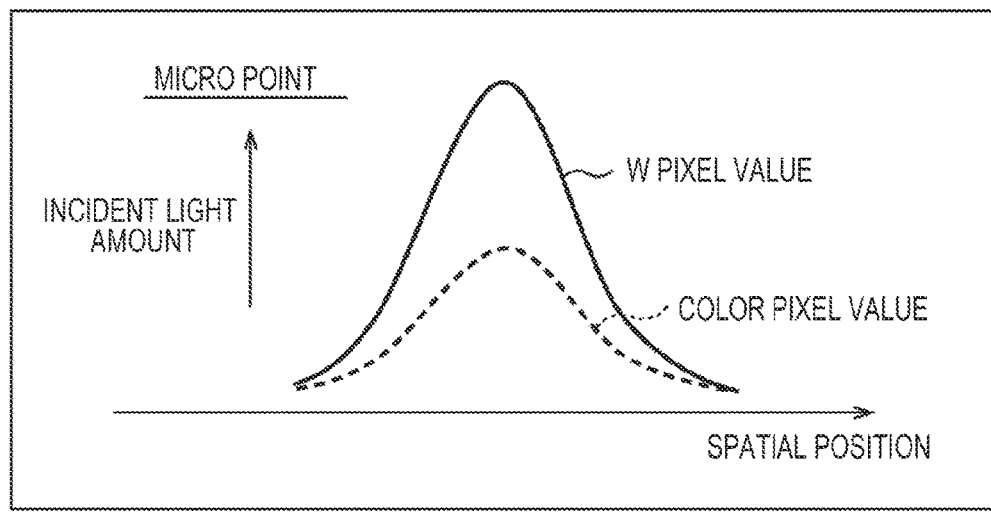
FIG. 8 is a view illustrating a pixel value distribution prior to sampling when a pixel of interest is a micro point.

Here, FIG. 8 shows spatial distributions of micro points prior to photoelectric conversion (prior to sampling) by the photoelectric conversion elements (photodiodes) of the solid-state imaging device 21. In FIG. 8, a horizontal axis represents a spatial position, while a vertical axis represents an incident light amount into the photoelectric conversion elements. A W pixel has a higher sensitivity than sensitivities of respective color pixels, in which condition an incident light amount into the W pixel becomes larger. Accordingly, pixel values of the W pixels (hereinafter also referred to as "W pixel values") exhibit a sharp distribution containing a higher peak value than that of pixel values of color pixels (hereinafter also referred to as "color pixel values").

Figure 9:
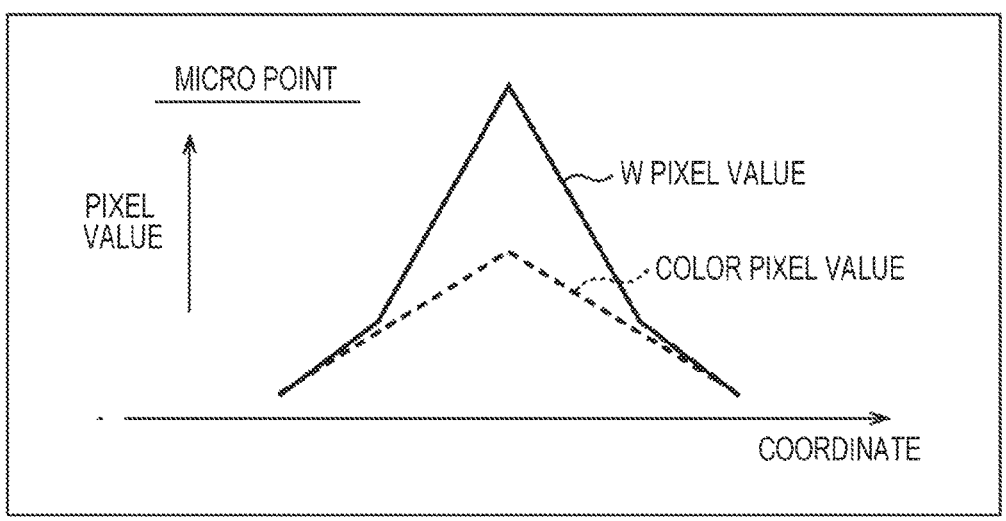
FIG. 9 is a view illustrating a pixel value distribution after sampling when a pixel of interest is a micro point.

On the other hand, FIG. 9 shows distributions of W pixel values and color pixel values produced on the basis of a horizontal axis representing coordinates and a vertical axis representing a pixel value in consideration of sampling by the photoelectric conversion elements. According to comparison between the distribution of the W pixel values and the distribution of the color pixel values in FIG. 9, a peak value of the distribution of the W pixel values becomes larger due to a large incident light amount of the W pixel. However, the coordinates of the peak positions of both the distributions coincide with each other. It is therefore considered that there is a correlation between the distribution of the W pixel values and the distribution of the color pixel values.

Figure 10:
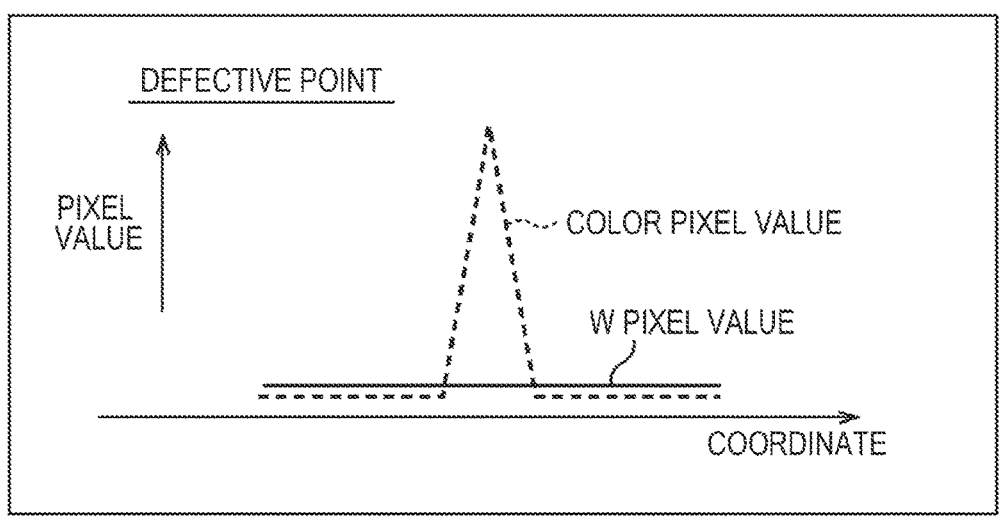
FIG. 10 is a view illustrating a pixel value distribution after sampling when a pixel of interest is a defective point.

On the other hand, in case of a defective pixel (defective point), W pixel values become constant even when color pixel values have a peak value as shown in FIG. 10. In this case, no correlation is recognized between the distribution of the W pixel values and the distribution of the color pixel values. The secondary estimation step distinguishes between a micro point and a defective point on the basis of the presence of absence of a correlation between distributions of W pixel values and of color pixel values.

Figure 11:
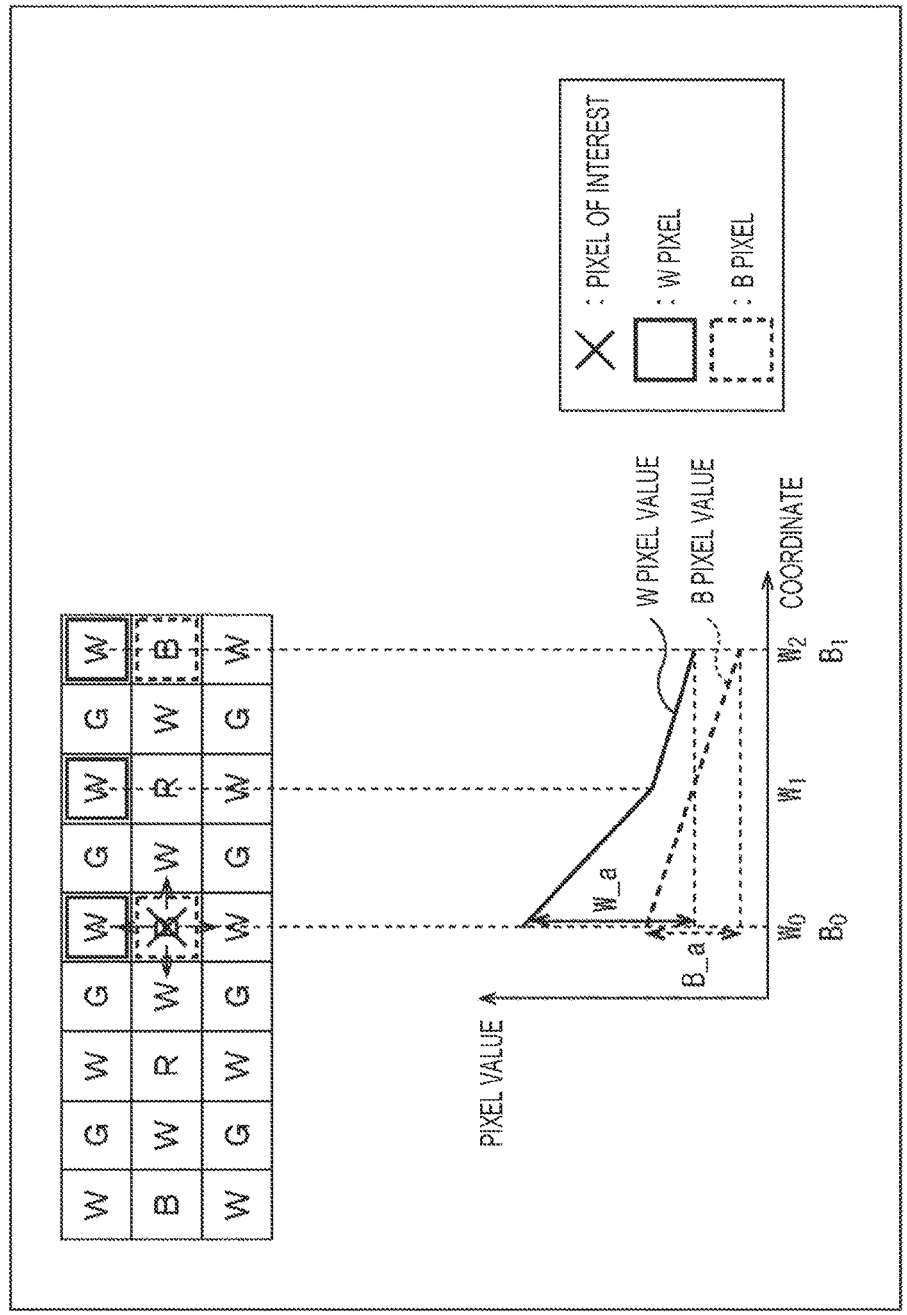
FIG. 11 is a view illustrating a secondary estimation step performed when a pixel of interest is a color pixel.

More specifically, when the pixel of interest is a B pixel, distinction between a micro point and a defective point is made in the following manner. That is, as illustrated in FIG. 11, a W pixel having the largest pixel value is initially selected from four W pixels adjacent to a pixel of interest corresponding to a $B_0$ pixel, and determined as a $W_0$ pixel to search for a peak of a micro point. According to the example discussed herein, a W pixel located above the pixel of interest ($B_0$ pixel) is selected. Subsequently, a W pixel shifted from the $W_0$ pixel to the right by two pixels is selected as $W_1$, while a W pixel shifted from the $W_1$ pixel to the right by two pixels is selected as $W_2$. Furthermore, a B pixel shifted from the $B_0$ pixel to the right by four pixels is selected as $B_1$.

Thereafter, a gradient (inclination) of the pixel values of the W pixels, and a gradient (inclination) of the pixel values of the B pixels are calculated on the basis of following equations (1) and (2).

$$W\_a = (\text{pixel value of } W_0 \text{ pixel}) - (\text{pixel value of } W_2 \text{ pixel}) \quad (1)$$

$$B\_a = (\text{pixel value of } B_0 \text{ pixel}) - (\text{pixel value of } B_1 \text{ pixel}) \quad (2)$$

Then, when both a condition (3) and a condition (4) shown below are satisfied, the pixel of interest ($B_0$ pixel) is estimated as not a defective pixel (defective point), but a micro point.

$$(\text{pixel value of } W_0 \text{ pixel}) \geq (\text{pixel value of } W_1 \text{ pixel}) \geq (\text{pixel value of } W_2 \text{ pixel}) \quad (3)$$

$$W\_a \times (\text{gain value}) > B\_a \quad (4)$$

Note that, in the condition (4), a gain value is a parameter adjustable by a register or the like.

Note that gradients of the W pixels and B pixels (W_a, B_a) are calculated on the left side of the pixel of interest ($B_0$ pixel), whereafter whether or not the relationships in the condition (3) and the condition (4) are satisfied is estimated similarly to the right side described above. Detailed description of this calculation and estimation is not repeated herein. In addition, when the relations of the condition (3) and the condition (4) are satisfied on either the left side or the right side of the pixel of interest ($B_0$ pixel), it is finally estimated that the pixel of interest ($B_0$ pixel) is not a defective pixel (defective point), i.e., the pixel of interest is a micro point. On the other hand, when the condition (3) and the condition (4) are satisfied on neither the left side nor the right side of the pixel of interest ($B_0$ pixel), it is estimated that the pixel of interest ($B_0$ pixel) is a defective pixel.

Note that the pixel of interest discussed herein with reference to FIG. 11 is a B pixel. When the pixel of interest is a pixel in a different color (R pixel or G pixel), whether or not the pixel of interest (R pixel or G pixel) is a defective pixel (or a micro point) is estimated similarly to the B pixel of interest described above.

Figure 12:
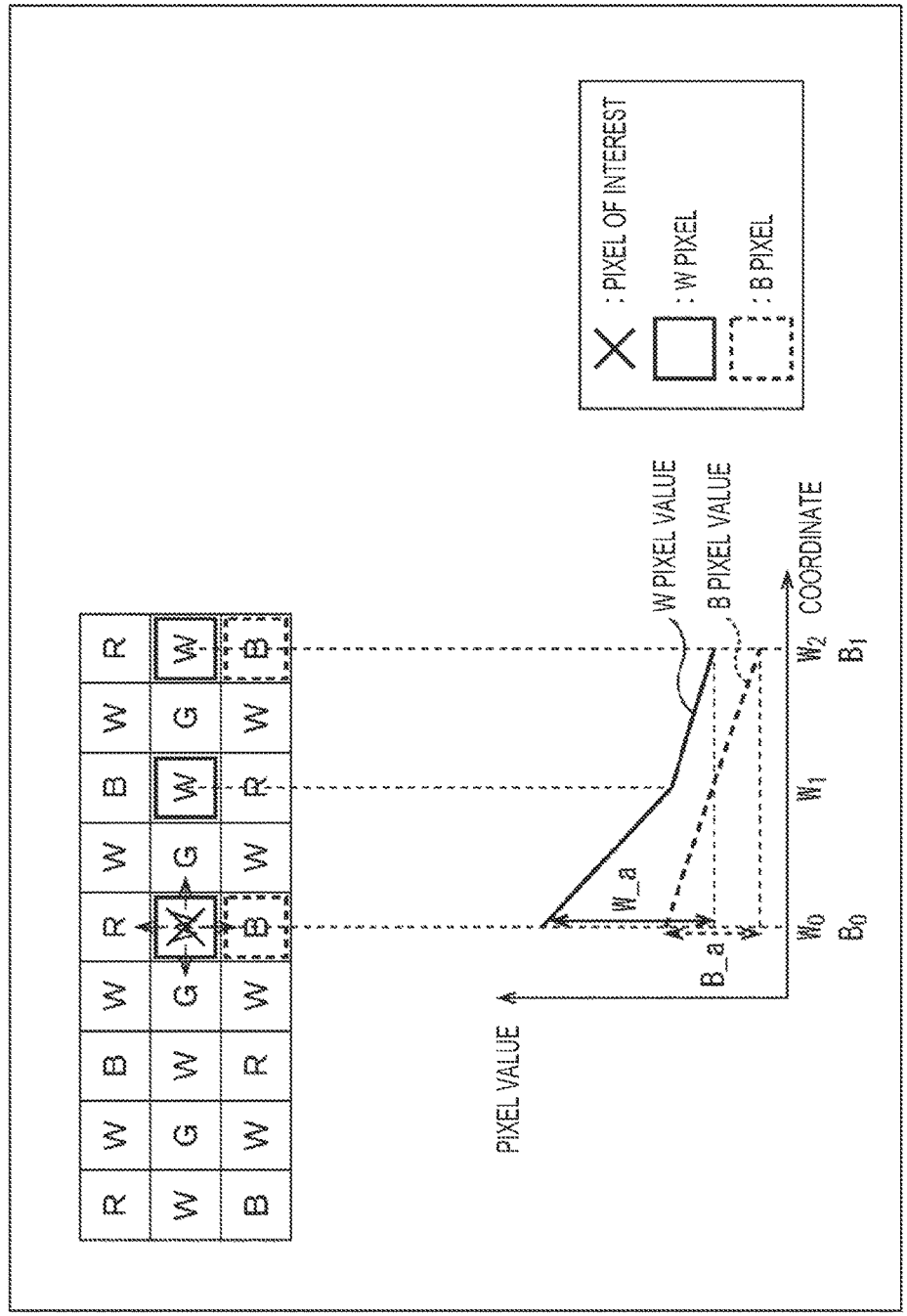
FIG. 12 is a view illustrating the secondary estimation step performed when a pixel of interest is a W pixel.

When the pixel of interest is a W pixel, distinction between a micro point and a defective point is made in the following manner, for example. That is, as illustrated in FIG. 12, a color pixel having the largest pixel value is initially selected from four color pixels adjacent to the pixel of interest corresponding to the $W_0$ pixel. According to the example discussed herein, a B pixel located below the pixel of interest ($W_0$ pixel) is selected as a pixel $B_0$. Subsequently, a B pixel shifted from the $B_0$ pixel to the right by four pixels is selected as $B_1$. Furthermore, a W pixel shifted to the right by two pixels from the $W_0$ pixel corresponding to the pixel of interest is selected as $W_1$, while a W pixel shifted from the $W_1$ pixel to the right by two pixels is selected as $W_2$.

Subsequently, a gradient (inclination) of pixel values of the B pixels, and a gradient (inclination) of pixel values of W pixels are calculated by using an equation (5) and an equation (6) shown below.

$$B\_a = (\text{pixel value of } B_0 \text{ pixel}) - (\text{pixel value of } B_1 \text{ pixel}) \quad (5)$$

$$W\_a = (\text{pixel value of } W_0 \text{ pixel}) - (\text{pixel value of } W_2 \text{ pixel}) \quad (6)$$

Then, when both a following condition (7) and a following condition (8) are satisfied, it is estimated that the pixel of interest ($W_0$ pixel) is not a defective pixel (defective point), but a micro point.

$$(\text{pixel value of } W_0 \text{ pixel}) \geq (\text{pixel value of } W_1 \text{ pixel}) \geq (\text{pixel value of } W_2 \text{ pixel}) \quad (7)$$

$$B\_a \times (\text{gain value}) > W\_a \quad (8)$$

Note that, in the condition (8), a gain value is a parameter adjustable by a register or the like.

Note that gradients of the B pixels and W pixels (B_a, W_a) are calculated on the left side of the pixel of interest ($W_0$ pixel), whereafter whether or not the relationships of the condition (7) and the condition (8) are satisfied is determined similarly to the right side described above. Detailed description of this calculation and estimation is not repeated herein. Then, when the condition (7) and the condition (8) are satisfied on either the left or the right of the pixel of interest ($W_0$ pixel), it is finally estimated that the pixel of interest ($W_0$ pixel) is not a defective pixel (defective point), i.e., the pixel of interest is a micro point. On the other hand, when the condition (7) and the condition (8) are satisfied on neither the left side nor the right side of the pixel of interest ($W_0$ pixel), it is estimated that the pixel of interest ($W_0$ pixel) is a defective pixel.

Returning to the flowchart shown in FIG. 5, it is determined in step S35 whether or not the pixel of interest is a defective pixel on the basis of an estimation result of the secondary estimation step in the process of step S34.

When it is determined in step S35 that the pixel of interest is not a defective pixel but a micro point, the flow proceeds to step S33. In step S33, the defective pixel correction unit 52 outputs the pixel of interest to the remosaic processing unit 42 without change. More specifically, when it is estimated that the pixel of interest is not a defective pixel in the secondary estimation step, the correction process is not performed for the pixel of interest even estimated as a possible defective pixel in the primary estimation step.

On the other hand, when it is determined in step S35 that the pixel of interest is a defective pixel, the flow proceeds to step S36. In step S36, the defective pixel correction unit 52 corrects the pixel of interest as a defective pixel, and outputs the corrected pixel of interest to the remosaic processing unit 42. Note that, for correction of the pixel of interest, the pixel of interest may be replaced with an average of two peripheral pixels having the same color as the color of the pixel of interest and selected for difference comparison with the pixel of interest, or may be replaced with a value of a pixel selected from the two peripheral pixels and indicating a value closer to the value of the pixel of interest, for example, while utilizing peripheral pixels surrounding the pixel of interest and having the same color as the color of the pixel of interest similarly to the primary estimation step which utilizes peripheral pixels surrounding the pixel of interest and having the same color as the color of the pixel of interest for estimation of the pixel of interest.

After completion of the process in step S33 or S36, the flow proceeds to step S37. In step S37, it is determined whether or not estimation of all pixels of interest has been completed. When it is determined in step S37 that estimation of all pixels of interest has not been completed yet, the flow returns to the process in step S31, whereafter the processes from step S31 to step S36 described above are repeated. Then, when it is determined in step S37 that estimation of all pixels of interest has been completed after the repeat of the processes from step S31 to step S37 described above, the defective pixel correction process ends. The flow returns to the process in step S11 in FIG. 4 to execute the processes in step S11 and subsequent steps.

The description of the defective pixel correction process is now completed. The defective pixel correction process performs two-stage estimation of the primary estimation step and the secondary estimation step. Particularly, the secondary estimation step obtains a correlation between pixel values of high-sensitivity pixels and pixel values of color pixels on the basis of distribution information on pixel values of peripheral high-sensitivity pixels (white (W) pixels) and pixel values of peripheral color pixels (red (R) pixels, green (G) pixels, or blue (B) pixels) surrounding the pixel of interest when it is estimated that the pixel of interest may be a defective pixel as an estimation result of the primary estimation step.

Here, when the pixel of interest is a color pixel in this process, the gradient of the pixel values of the peripheral high-sensitivity pixels surrounding the pixel of interest is compared with the gradient of the pixel values of the peripheral color pixels surrounding the pixel of interest and having the same color as the color of the pixel of interest. When the pixel of interest is a high-sensitivity pixel, the gradient of the pixel values of the peripheral color pixels surrounding the pixel of interest is compared with the gradient of the pixel values of the peripheral high-sensitivity pixels surrounding the pixel of interest. A correlation between the pixel values of the high-sensitivity pixels and the pixel values of the color pixels is obtained on the basis of the comparison. Then, when it is estimated that the pixel of interest may be a defective pixel in the primary estimation step, it is subsequently estimated whether or not the pixel of interest is a defective pixel, or a pattern having an extremely high spatial frequency (such as a micro point) in the secondary estimation step on the basis of the correlation thus obtained.

As described above, when no correlation is recognized between the pixel values of the high-sensitivity pixels and the pixel values of the color pixels on the basis of distribution information on the pixel values of the peripheral high-sensitivity pixels surrounding the pixel of interest, and on the pixel values of the peripheral color pixels surrounding the pixel of interest, the pixel of interest is determined as a defective pixel. It is therefore accurately determined whether the pixel of interest is a defective pixel, or a pattern having an extremely high frequency (such as a micro point) rather than a defective pixel. As a result, detection accuracy of a defective pixel increases. Accordingly, high-performance defective correction is realizable. It is further achievable to reduce a loss of a pattern or generation of a false color, which may be caused by erroneous determination or erroneous correction as a result of determination that a pattern having a high spatial frequency, rather than a defect, is a defect.

In addition, for correcting a defective pixel, there are a method which registers a position of a defect in a memory beforehand, and a method which detects a position of a defect by using two images captured in different imaging conditions. Both of these methods require a memory for storing a position of a defect and images, and therefore increase a hardware cost. However, the present technology eliminates the necessity of preparing a special memory, thereby reducing a rise of the hardware cost.

Further known is a method used by a solid-state imaging element (image sensor) having a Bayer array for detecting a defective pixel on the basis of information on peripheral pixels. This method detects a pixel of interest as a defective pixel when a difference between the pixel of interest and an average of color pixels surrounding the pixel of interest and having the same color as the color of the pixel of interest is large. However, peripheral pixels contained in a Bayer array and having the same color are located at positions shifted from the pixel of interest by two pixels for each. According to this method, a pattern having an extremely high spatial frequency (such as a micro point) may be erroneously detected and erroneously corrected as a defect. Furthermore, when white (W) pixels are added to primary color pixels in an array, density of color pixels further decreases. In this case, pixels in the same color as the color of the pixel of interest are located at far positions, wherefore erroneous detection and erroneous correction may further increase.

There is a still further method which applies a result of comparison with peripheral pixels in the same color as the color of the pixel of interest to defect determination of a pixel of interest and pixels having different colors and located adjacent to the pixel of interest. However, a comparison between only pixels in the same color may not be effective when a high-frequency pattern has a chromatic color. According to the present technology, however, correction is performed for a pixel of interest estimated as defective on the basis of two-stage estimation results of the primary estimation step and the secondary estimation step as described above. Accordingly, a defective pixel is securely detected and corrected.

4. Modified Examples

According to the method described above, gradients (inclinations) of pixel values of W pixels and color pixels in the horizontal direction are calculated for a pixel of interest in the secondary estimation step (process in step S34 in FIG. 5). However, pixels located in the vertical direction with respect to a pixel of interest may be selected to calculate gradients (inclinations) of pixel values of W pixels and color pixels in the vertical direction.

Figure 13:
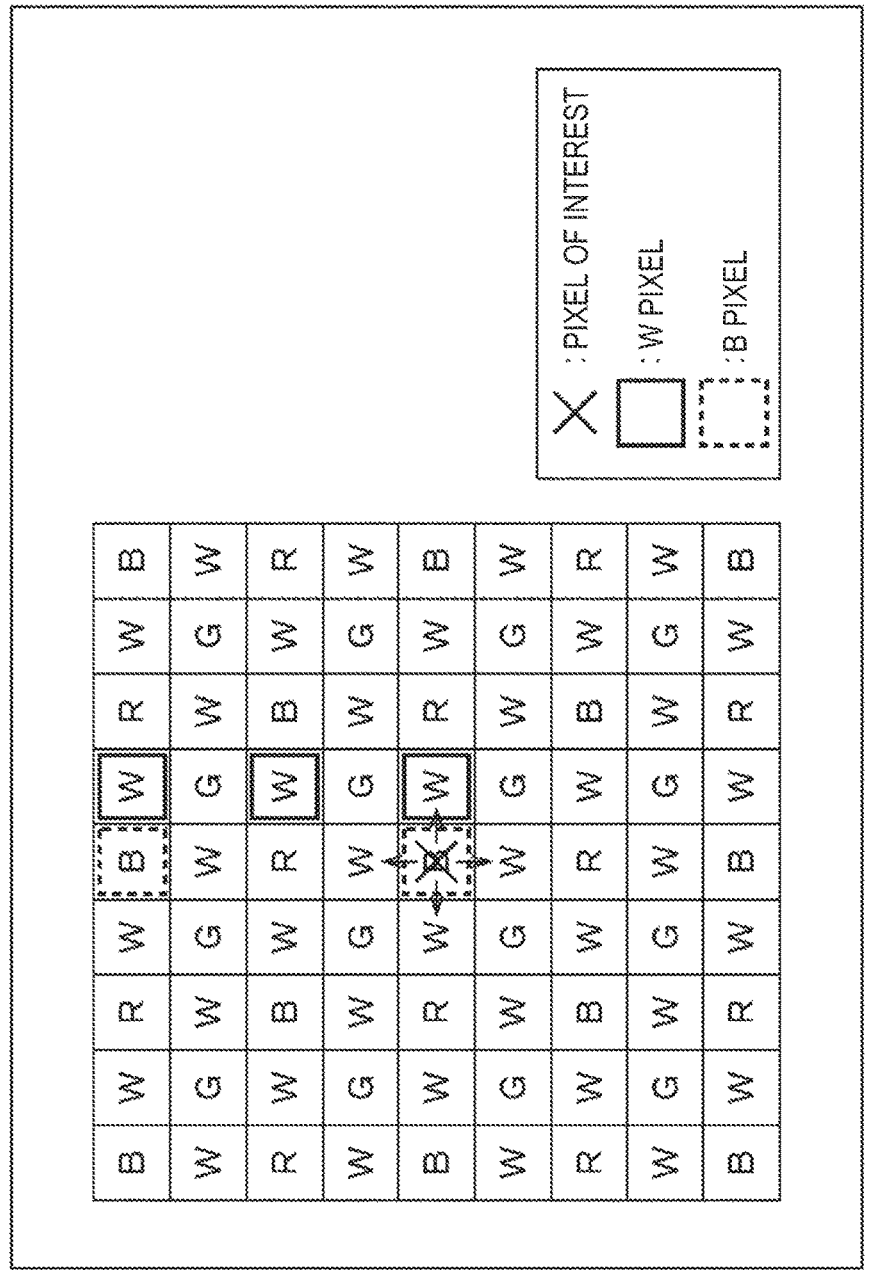
FIG. 13 is a view illustrating another estimation method of the secondary estimation step.

When the pixel of interest is a B pixel as illustrated in FIG. 13, for example, a W pixel having the largest pixel value is selected from four W pixels adjacent to the pixel of interest (B pixel). According to this example, a W pixel on the right side of the pixel of interest (B pixel) is selected. Subsequently selected are a W pixel shifted upward by two pixels, and a W pixel shifted upward by four pixels from the W pixel on the right side of the pixel of interest (B pixel).

Moreover, a B pixel shifted upward by four pixels from the pixel of interest (B pixel) is selected. Then, a gradient (inclination) of pixel values of the W pixels and a gradient (inclination) of pixel values of the B pixels selected in this manner are obtained similarly to the gradients of the pixel values in the horizontal direction as described above. Accordingly, when relationships of predetermined conditions (such as the condition (3) and the condition (4) described above) hold, it is estimated that the pixel of interest (B pixel) is not a defective pixel (defective point), but a micro point. Note that while the B pixel of interest has been discussed with reference to FIG. 13, a W pixel of interest or other pixels may be estimated in a similar manner.

In addition, while a defective white point is detected and corrected as a defective pixel in the example described above, a defective black point may be detected in a similar manner by reversing the foregoing correlation between pixel values.

Note that embodiments of the present technology are not limited to the specific embodiment described herein. Various modifications and changes may be made without departing from the subject matters of the present technology.

In addition, the present technology may have following configurations.

(1)

An image processing device including:

a defective pixel estimation unit that estimates a defect of a pixel of interest in an image captured by a solid-state imaging device that contains a two-dimensional array of color pixels, and high-sensitivity pixels having higher sensitivity than sensitivities of the color pixels, the defect of the pixel of interest being estimated on the basis of a correlation between pixel values of the high-sensitivity pixels, and pixel values of the color pixels; and a defective pixel correction unit that corrects the pixel of interest when it is estimated that the pixel of interest is a defective pixel.

(2)

The image processing device according to (1), wherein the defective pixel estimation unit obtains the correlation between the pixel values of the high-sensitivity pixels and the pixel values of the color pixels on the basis of distribution information on pixel values of the peripheral high-sensitivity pixels and the peripheral color pixels surrounding the pixel of interest.

(3)

The image processing device according to (2), wherein when the pixel of interest is one of the color pixels, the defective pixel estimation unit compares a gradient of the pixel values of the peripheral high-sensitivity pixels surrounding the pixel of interest with a gradient of the pixel values of the peripheral color pixels surrounding the pixel of interest and having the same color as the color of the pixel of interest, when the pixel of interest is one of the high-sensitivity pixels, the defective pixel estimation unit compares a gradient of the pixel values of the peripheral color pixels surrounding the pixel of interest with a gradient of the pixel values of the peripheral high-sensitivity pixels surrounding the pixel of interest, and the defective pixel estimation unit obtains the correlation between the pixel values of the high-sensitivity pixels and the pixel values of the color pixels on the basis of the comparison.

(4)

The image processing device according to (3), wherein the defective pixel estimation unit obtains the gradient of the pixel values of the high-sensitivity pixels, and the gradient of the pixel values of the color pixels in a horizontal direction or a vertical direction with respect to the pixel of interest.

(5)

The image processing device according to any one of (1) through (4), wherein the defective pixel estimation unit estimates a possibility of a defect of the pixel of interest by comparing a predetermined threshold with a difference between a pixel value of the pixel of interest and an average of the pixel values of the peripheral color pixels surrounding the pixel of interest and having the same color as the color of the pixel value, and the defective pixel estimation unit estimates the defect of the pixel of interest on the basis of the correlation between the pixel values of the high-sensitivity pixels and the pixel values of the color pixels when it is estimated that the pixel of interest may be a defective pixel.

(6)

The image processing device according to any one of (1) through (5), wherein the high-sensitivity pixels are white (W) pixels, and the color pixels are red (R) pixels, green (G) pixels, or blue (B) pixels.

(7)

An image processing method for an image processing device, the method being performed by the image processing device and including steps of:

estimating a defect of a pixel of interest in an image captured by a solid-state imaging device that contains a two-dimensional array of color pixels, and high-sensitivity pixels having higher sensitivity than sensitivities of the color pixels, the defect of the pixel of interest being estimated on the basis of a correlation between pixel values of the high-sensitivity pixels, and pixel values of the color pixels; and correcting the pixel of interest when it is estimated that the pixel of interest is a defective pixel.

(8)

An image processing system including:

a solid-state imaging device that contains a two-dimensional array of color pixels, and high-sensitivity pixels having higher sensitivity than sensitivities of the color pixels; and an image processing device that includes a defective pixel estimation unit for estimating a defect of a pixel of interest in an image captured from the solid-state imaging device on the basis of a correlation between pixel values of the high-sensitivity pixels, and pixel values of the color pixels, and includes a defective pixel correction unit for correcting the pixel of interest when it is estimated that the pixel of interest is a defective pixel.

REFERENCE SIGNS LIST

10 Image processing system
21 Solid-state imaging device
22 Image processing device
23 Recording device
31 Color filter
41 Defective pixel correction processing unit
42 Remosaic processing unit
43 Camera signal processing unit
51 Defective pixel estimation unit
52 Defective pixel correction unit

The invention claimed is:
1. An image processing device, comprising:
circuitry configured to:
obtain a first correlation between pixel values of high-sensitivity pixels and pixel values of color pixels based on distribution information associated with the pixel values of the high-sensitivity pixels and the pixel values of the color pixels in an image captured by a solid-state imaging device, wherein
the image contains a two-dimensional array of the color pixels and the high-sensitivity pixels,
the high-sensitivity pixels have higher sensitivity than sensitivities of the color pixels, and
the high-sensitivity pixels and the color pixels surround a pixel of interest;
compare, based on the pixel of interest being one of the color pixels or the high-sensitivity pixels, a gradient of the pixel values of the high-sensitivity pixels that surrounds the pixel of interest with a gradient of the pixel values of the color pixels that surrounds the pixel of interest, wherein a color of the color pixels is same as a color of the pixel of interest;
obtain a second correlation between the pixel values of the high-sensitivity pixels and the pixel values of the color pixels based on the comparison;
estimate a defective pixel in the image based on the obtained second correlation between the pixel values of the high-sensitivity pixels and the pixel values of the color pixels; and correct a defect of the pixel of interest in the image based on estimation that the pixel of interest is the defective pixel.

2. The image processing device according to claim 1, wherein the circuitry is further configured to obtain the gradient of the pixel values of the high-sensitivity pixels and the gradient of the pixel values of the color pixels in one of a horizontal direction or a vertical direction with respect to the pixel of interest.

3. The image processing device according to claim 1, wherein the circuitry is further configured to:
 compare a difference between a pixel value of the pixel of interest and an average of the pixel values of the color pixels that surrounds the pixel of interest with a threshold value;
 estimate a possibility of the defect of the pixel of interest based on the comparison of the difference between the pixel value of the pixel of interest and the average of the pixel values of the color pixels that surrounds the pixel of interest with the threshold value; and
 estimate the defective pixel based on the first correlation between the pixel values of the high-sensitivity pixels and the pixel values of the color pixels, wherein the pixel of interest is the defective pixel.

4. The image processing device according to claim 1, wherein the high-sensitivity pixels are white (W) pixels and,
wherein the color pixels are one of red (R) pixels, green (G) pixels, or blue (B) pixels.

5. An image processing method, comprising:
in an image processing device:
 obtaining a first correlation between pixel values of high-sensitivity pixels and pixel values of color pixels based on distribution information associated with the pixel values of the high-sensitivity pixels and the pixel values of the color pixels in an image captured by a solid-state imaging device, wherein
 the image contains a two-dimensional array of the color pixels and the high-sensitivity pixels,
 the high-sensitivity pixels have higher sensitivity than sensitivities of the color pixels, and
 the high-sensitivity pixels and the color pixels surround a pixel of interest;
 comparing, based on the pixel of interest being one of the color pixels or the high-sensitivity pixels, a gradient of the pixel values of the high-sensitivity pixels that surrounds the pixel of interest with a gradient of the pixel values of the color pixels that surrounds the pixel of interest, wherein a color of the color pixels is same as a color of the pixel of interest;
 obtaining a second correlation between the pixel values of the high-sensitivity pixels and the pixel values of the color pixels based on the comparison;
 estimating a defective pixel in the image based on the obtained second correlation between the pixel values of the high-sensitivity pixels and the pixel values of the color pixels; and
 correcting a defect of the pixel of interest in the image based on estimation that the pixel of interest is the defective pixel.

6. An image processing system, comprising:
a solid-state imaging device configured to capture an image, wherein
 the image contains a two-dimensional array of color pixels and high-sensitivity pixels,
 the high-sensitivity pixels have higher sensitivity than sensitivities of the color pixels, and
 the high-sensitivity pixels and the color pixels surround a pixel of interest; and
an image processing device, comprising:
 circuitry configured to:
 obtain a first correlation between pixel values of high-sensitivity pixels and pixel values of color pixels in the image;
 comparing, based on the pixel of interest being one of the color pixels or the high-sensitivity pixels, a gradient of the pixel values of the high-sensitivity pixels that surrounds the pixel of interest with a gradient of the pixel values of the color pixels that surrounds the pixel of interest, wherein a color of the color pixels is same as a color of the pixel of interest;
 obtaining a second correlation between the pixel values of the high-sensitivity pixels and the pixel values of the color pixels based on the comparison;
 estimate a defective pixel in the image based on the obtained second correlation between the pixel values of the high-sensitivity pixels and the pixel values of the color pixels; and
 correct a defect of the pixel of interest in the image based on the estimation that the pixel of interest is the defective pixel.

7. An image processing device, comprising:
circuitry configured to:
 obtain a correlation between pixel values of high-sensitivity pixels and pixel values of color pixels in an image captured by a solid-state imaging device,
 wherein the image contains a two-dimensional array of the color pixels and the high-sensitivity pixels, and
 wherein the high-sensitivity pixels have higher sensitivity than sensitivities of the color pixels;
 compare a difference between a pixel value of a pixel of interest and an average of the pixel values of the color pixels that surrounds the pixel of interest with a threshold value, wherein a color of the color pixels is same as a color of the pixel of interest;
 estimate a possibility of a defect of the pixel of interest in the image based on the comparison;
 estimate a defective pixel in the image based on the correlation between the pixel values of the high-sensitivity pixels and the pixel values of the color pixels; and
 correct the defect of the pixel of interest based on estimation that the pixel of interest is the defective pixel.

* * * * *